(12) United States Patent
Fournier et al.

(10) Patent No.: US 7,653,189 B1
(45) Date of Patent: Jan. 26, 2010

(54) TELECOMMUNICATIONS SERVICE NEGOTIATION

(75) Inventors: Pierre Fournier, Ottawa (CA); Laurence Beaulieu, Kanata (CA); Paul Ensing, Nepean (CA); Sergio Fiszman, Nepean (CA); Elizabeth Goldrich, Dallas, TX (US); Kevin Howe-Patterson, Nepean (CA); Michael Leeder, Stittsville (CA); David Price, Reading (GB); Chris Ryerson, Kanata (CA); Richard Taylor, Manotick (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 905 days.

(21) Appl. No.: 10/937,573

(22) Filed: Sep. 9, 2004

Related U.S. Application Data

(60) Provisional application No. 60/549,511, filed on Mar. 2, 2004.

(51) Int. Cl.
*H04M 3/42* (2006.01)
(52) U.S. Cl. .............................. 379/201.01; 379/15.03; 379/26.01; 379/221.02; 379/221.14
(58) Field of Classification Search ............ 379/100.03, 379/102.2, 127.05, 15.03, 26.01, 221.02, 379/221.14, 201.01
See application file for complete search history.

(56) References Cited

U.S. PATENT DOCUMENTS

| 6,912,532 | B2 * | 6/2005 | Andersen ................. 707/10 |
| 2004/0243503 | A1 * | 12/2004 | Eng et al. ................. 705/37 |
| 2007/0283423 | A1 * | 12/2007 | Bradley et al. ............. 726/4 |

* cited by examiner

*Primary Examiner*—Curtis Kuntz
*Assistant Examiner*—Yosef K Laekemariam
(74) *Attorney, Agent, or Firm*—Anderson Gorecki & Manaras LLP

(57) ABSTRACT

A service tender node functions as an intermediary between subscribers and adjunct telecommunications services from multiple service providers to facilitate negotiation of services in real-time. The service tender node includes an index of services which is maintained and employed to search for applicable services in response to a tender request generated by a subscriber. Records in the index are described with an adaptive service definition which includes standard parameters and subjective parameters. The standard parameters identify types of service pursuant to telecommunications industry standards. The subjective parameters may be specified by individual service providers in order to differentiate their services within the service type defined by the standard parameters. Services generated from a search of the index pursuant to the standard parameters may be further sorted and filtered according to a comparison between a subscriber profile and the subjective parameters.

18 Claims, 3 Drawing Sheets

TELECOMMUNICATIONS SERVICE NEGOTIATION

CROSS-REFERENCE TO RELATED APPLICATIONS

A claim of priority is made to U.S. Provisional Patent Application Ser. No. 60/549,511, entitled SERVICE NEGOTIATION BY SERVICE DESCRIPTION, filed Mar. 2, 2004.

FIELD OF THE INVENTION

This invention is generally related to telecommunications services, and more particularly to identifying, selecting and providing telecommunications services in real-time.

BACKGROUND OF THE INVENTION

Telecommunications providers typically offer an array of adjunct services in conjunction with basic telephone service. For example, legacy services such as directory assistance, call waiting, caller identification, and call forwarding, and multimedia services such as Push-to-Talk, Video on demand, VoIP, and presence are services that a subscriber may utilize. Adjunct services make telephone service more useful and generally increase the revenues of telecommunications service providers.

Various factors presently inhibit telecommunications service providers from offering more adjunct services and encouraging the use of adjunct services by a greater number of subscribers. One inhibiting factor is that each service must have relatively broad demand to the community of subscribers in order to be economically viable. Part of the reason for this is that services are typically developed, maintained and managed by the telecommunications provider at considerable expense. Another inhibiting factor is that the services may only be functional with the infrastructure platforms for which it was designed, thereby limiting the possibility of generating revenue through reuse and increasing platform migration costs. Adjunct services are typically fully deployed in the network of the service provider that is selling the service, which increases the overall cost of providing the service. Another inhibiting factor is that many adjunct services are manually initiated and static. Manual initiation, i.e., initiation by the actions of telephone company personnel each time the service is used such as traditional directory assistance, is relatively slow and costly. Static services, i.e., subscriptions for unlimited use of a service such as call forwarding for a recurring monthly charge, may not appeal to those who would use a service only once or even occasionally. It would therefore be desirable to solve these problems and facilitate economical provisioning of a greater variety adjunct services.

SUMMARY OF THE INVENTION

In accordance with the present invention a Service Tender Node (STN) functions as an intermediary between subscribers and adjunct telecommunications services from multiple service providers. The service tender node facilitates negotiation of services in real-time by a telecommunications provider. In particular, the service tender node maintains a technology-transparent index of available services which is searched for applicable services in response to a tender request generated by a subscriber.

Records in the index of available services employ an adaptive service definition to facilitate a quick and successful search. The adaptive service definition includes standard parameters and subjective parameters. The standard parameters identify types of service pursuant to telecommunications industry standards. The subjective parameters may be specified by individual service providers in order to differentiate their services within the service type defined by the standard parameters. In response to a tender request from a subscriber for a particular type of service, the service tender node searches the index of available services based on the adaptive service definition. The matching services may be further sorted and filtered according to a subscriber profile, preferences and other parameters. The subscriber is then presented with information based at least partially on the subjective parameters and provided an opportunity to select one of the matching services located by the search. The subscriber may also be provided information with which to choose a particular service from multiple possibilities.

One advantage of the invention is that a greater variety and number of services may be economically viable, and hence practical to provide to subscribers. The invention enables access to services from both the telecommunications provider and third party service providers. Because third party service providers may make a service available to subscribers of multiple telecommunications providers, and subscribers of other communications technologies as well, the effective subscriber base for a given service is increased beyond a single telecommunications provider, thereby enhancing the economic viability of the service.

Another advantage of the invention is facilitating automated, real-time tendering of services. By using the service tender node and adaptive service definition subscriber input can be utilized to quickly identify, select and provision a service during a single session. Consequently, telecommunications services are made more useful and flexible.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
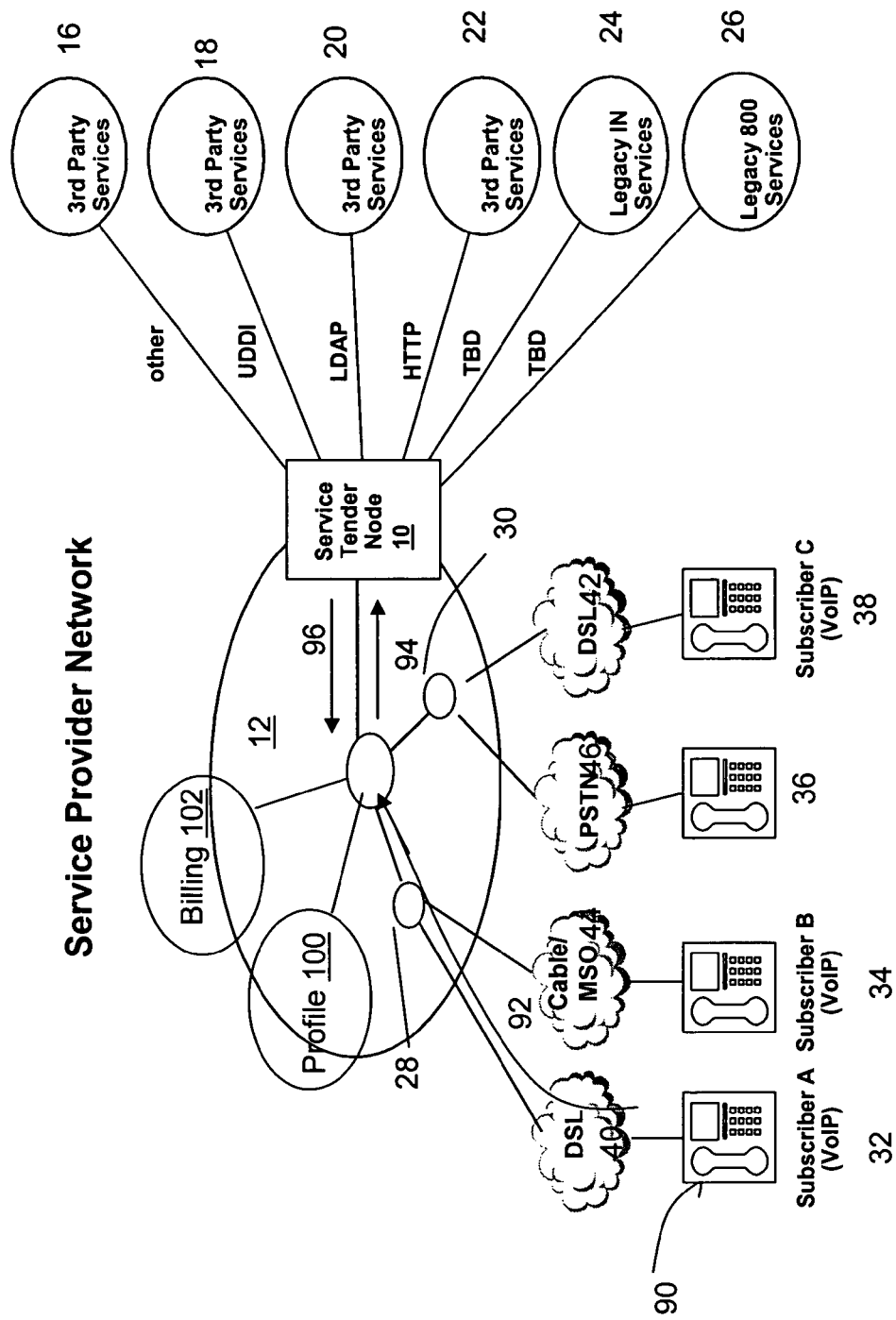
FIG. 1 is a network diagram illustrating interconnection of the service tender node with other network devices.

FIG. 1 illustrates a network architecture for facilitating service negotiation. A service tender node 10 is located in a service provider network 12, logically disposed between a network based service control node, such as a Serving Call Session Control Function ("S-CSCF") 14 and devices for providing telecommunications services 16, 18, 20, 22, 24, 26. The devices for providing services include both devices which may be owned and operated by the service provider, such as legacy IN services 24 and legacy 800 services 26, and devices owned and operated by third parties 16, 18, 20, 22. The S-CSCF 14 is in communication with a plurality of Proxy CSCF (P-CSCF) interfaces 28, 30, which in-turn are in communication with subscriber devices 32, 34, 36, 38 via access networks such as Digital Subscriber Line ("DSL") networks 40, 42, cable networks 44 and the Public Switched Telephone Network ("PSTN") 46. The S-CSCF and P-CSCF comprise software modules which are operative to facilitate service negotiation by executing various high level tasks. It should be noted that in addition to functions described with regard to the present invention, the S-CSCF and P-CSCF may perform various functions which are not directly related to the present invention pursuant to implementations proposed by the 3$^{rd}$ Generation Partnership Project ("3GPP") standards organization. Alternatively, the S-CSCF and P-CSCF functions which are part of the present invention may be implemented as a separate network module such as a SOAP (please expand) client running on a dedicated server.

Figure 2:
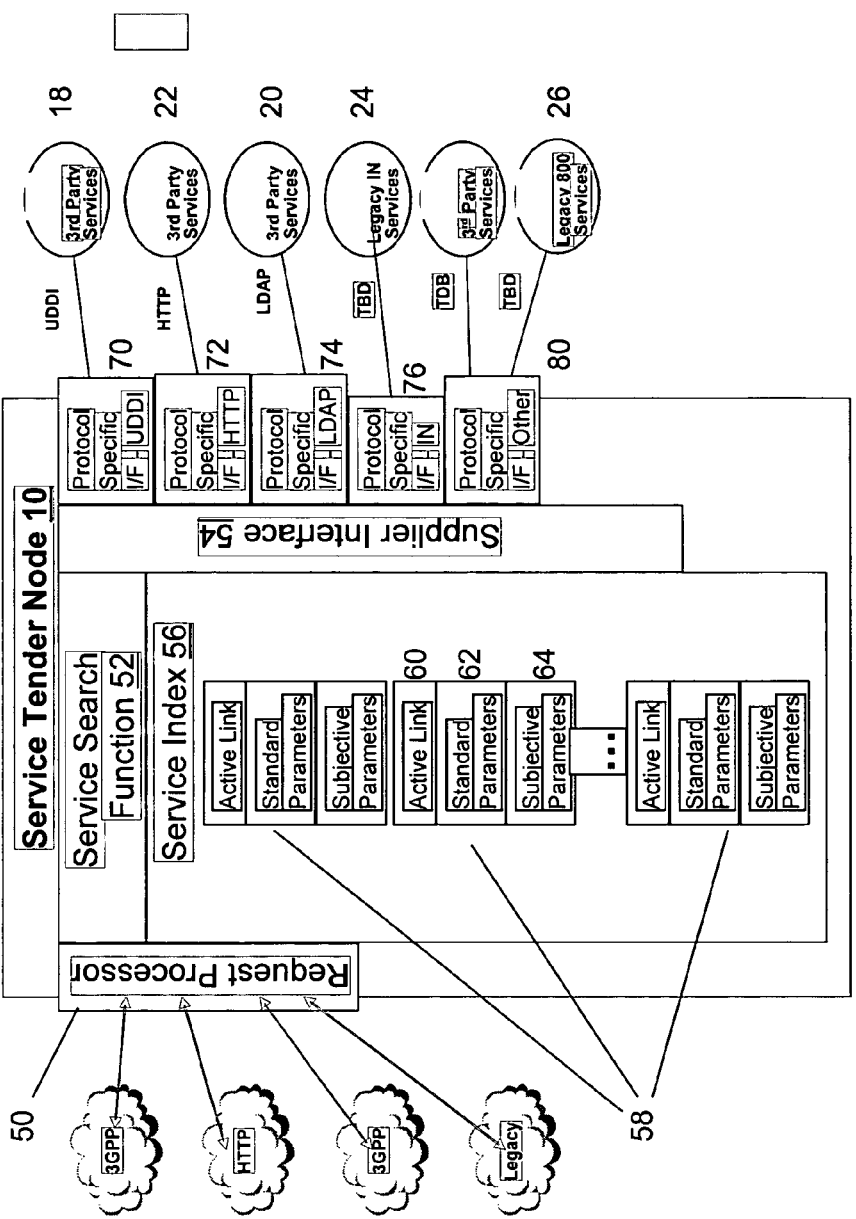
FIG. 2 illustrates the service tender node of FIG. 1 in greater detail.

Referring to FIG. 2, the service tender node 10 includes a request processor 50, a service search function 52, a supplier interface 54 and an index 56 of available services. The index includes records 58 that describe each service in an adaptive service definition format. The adaptive service definition includes an active link 60, standard parameters 62 and subjective parameters 64.

The active link 60 indicates a network path for invoking a particular service. The path may be entirely within the service provider network or may be partially outside the service provider network. For example, the computational resources necessary to provide the service may be provided by the telecommunications provider by loading and executing code from the third party service provider.

The standard parameters 62 may include, and are not limited to: (1) a Service Identifier (SI) which is a unique code that maps to an index defined and maintained by an industry or standards body; (2) a Desired Quality (DQ) including a series of sub-parameters which describe QoS, delay, jitter, QoE, and any other characteristic deemed relevant; (3) a Security Method (SM) indicator which specifies a security method such as IPSEC, VPN, no security, or some other method; (4) an Approximate Start Time (AST) indicator which could indicate a Universal Coordinated Time (UCT) stamp for a future start, e.g., for video streaming, or simply "immediate"; (5) a Media Type (MT), which is a service specific identifier such as g.711, g.723, MPEG2, etc; (6) a Transport Protocol (TP) to identify protocols such as ATM, IP, FR CBR, IPV6, etc; (7) a Cost Target (CT) which indicates the cost to the service provider prior to pre-customer mark-up, e.g., 7.99 US$ per minute; (8) Device Characteristics (DC) including some form of operations description of the end device(s) to be defined by an industry or standards body; (9) a Maximum Number of Service Suppliers (MNSS) limit on the size of the Reply message by controlling the number of returned matches; (10) a Rating Method (RM) indicating the granularity of rating to be applied to the call for billing and charging purposes; (11) Access Restrictions (AR) indicating the level of openness of service, and ability to access based on credentials from different users; (12) a SLA Guarantee (SLAG) indicator of the service level guarantee offered on a given service by the service provider in question; and (13) an indicator of any other parameters to be approved by an industry or standards body, or defined by an industry or standards body.

The subjective parameters 64 may include, and are not limited to: (1) a Geographical Proximity (GP) indicator to specify a geographical request, e.g., nearest source to Karachi; (20 a Consumer Billing Preference (CBP) indicator such as consumer direct, Pay Pal, credit card, or inter-company indicator that an agreement is in place; and (3) Currency Preference (CP) by which the service supplier can specify a billing currency.

Index records 58 associated with third party services suppliers 18, 20, 22 may be added, dropped and updated via the supplier interface 54 of the service tender node 10. The supplier interface includes multiple protocol-specific interface modules 70, 72, 74, 76, 80 to facilitate communication with legacy service devices 24, 26 and the third party services suppliers 18, 20, 22 for service negotiation in addition to adding, changing and removing records 58 from the index 56. In the illustrated embodiment the available protocols include UDDI, Legacy IN, HTTP, and LDAP. Further, a messaging protocol may be established to facilitate communications between the service tender node and the third party services providers. For example, the messaging protocol could include a Service Offer (SO) message by which a supplier indicates to service tender node that the supplier desires to vend a service. The SO message contains the adaptive service definition description of the service and an active link to the service. A Service Accepted (SA) message may be employed by the service tender node to indicate to the supplier that the service identified in the SO message has been added to the index and is ready for tender. A Service Denied (SD) message may be employed by the service tender node to indicate to the supplier that there is a problem with information in the adaptive service definition to the service. A Disable Service (DS) message may be employed by the supplier to request that the service tender node remove an identified service from the index. A Service Working (SWRK) message may be employed by the service tender node to "ping" the supplier to determine that the service and the active link are functioning properly. A Service OK (SOK) message may be employed by suppliers to reply to the SWRK. The protocol may also include means for verifying the identity of the service suppliers so that only service suppliers verified as trusted suppliers are able to modify the index.

Referring now to both FIG. 1 and FIG. 2, having described how the index 56 may be populated and maintained, service negotiation will now be described. Service negotiation is initiated by a subscriber via a subscriber device in accordance with standard or extended SIP messaging procedures. For example, subscriber 32 may initiate service negotiation by selecting a menu option using a screen, keypad or voice indicator associated with the subscriber device 90. In response to the subscriber input, the subscriber device 90 generates a message 92, such as a SIP invite message, which is transmitted to the P-CSCF 28 with which the subscriber device is in communication. Note that the service request message, which may be translated into different formats as described below, is generally referred to herein as a "tender request" or "tender message," independent of the format. The message 92 functions as at least a partial indicator of the type of service desired by the subscriber 32. The P-CSCF 28 is operative in response to receipt of the message 92 to forward the message to the S-CSCF 14. The S-CSCF is operative to translate the message 92 into a service request identifier 94. The S-CSCF also determines whether the requested service can be provided with an existing set of capabilities associated with the S-CSCF. For example, some statically provisioned services available to the subscriber may be made available directly through the S-CSCF. If the S-CSCF determines that the requested service cannot be provided with its existing capabilities, the S-CSCF forwards the service request identifier to the service tender node 10.

Referring now to FIGS. 1 and 2, the service tender node 10 is operative in response to the service request identifier 94 to search for matching available services. The request processor 50 is operative to queue requests in tender messages from various subscribers based on predetermined fairness and priority parameters. For example, subscriber requests may be given equal priority, or requests from some subscribers may be given enhanced priority pursuant to a premium service plan. The request processor may also sort requests into related groups, and translate service request identifiers into the adaptive service definition format. Subsequently, the request processor invokes the service search function 52 which is operative to perform a search of a service index 56 containing the records 58 of available services described in terms of the adaptive service definition. In particular, matches of the service request identifier 94 with the standard parameters 64 are located in the index. If the service request identifier is not in the format of the standard parameters then the service request identifier is translated into the format of the standard parameters prior to executing the search.

Following the search, the service tender node 10 is operative to assemble a list of n potential services produced by the search in a reply message 96 which is transmitted to the S-CSCF 14. For each matching service the reply message 96 includes an active link to the service, i.e., URL, URI, IP address, HTTP address, or the like, and a subjective information delta component, i.e., an indication of the subjective parameters. The subjective information delta component may be utilized by the S-CSCF in conjunction with information already available to the S-CSCF about the subscriber 32 via a profile to filter and select services listed in the reply message. For example, the S-CSCF may narrow the list of services for the subscriber 32 by examining the subscriber's profile 100 to further research subscriber's billing preferences. If the subscriber's profile indicates a preference to be billed via a debit card and the reply message 96 includes three services that match the debit card billing preference then the S-CSCF sends only the list of three to the subscriber's device 90 display so that a selection can be made. The telecommunications provider may further sort the list of three services in order of preference according to a list of preferred business suppliers. For example, the first service displayed in the list may be a preferred partner.

The service is further negotiated and provisioned once the subscriber 32 selects a service from the displayed choices. For example, billing procedures 102 may be invoked, established and agreed. The service tender node may facilitate further service negotiation by functioning as intermediary between the subscriber and the services provider, or the further negotiation may be executed directly between the subscriber and services provider.

Figure 3:
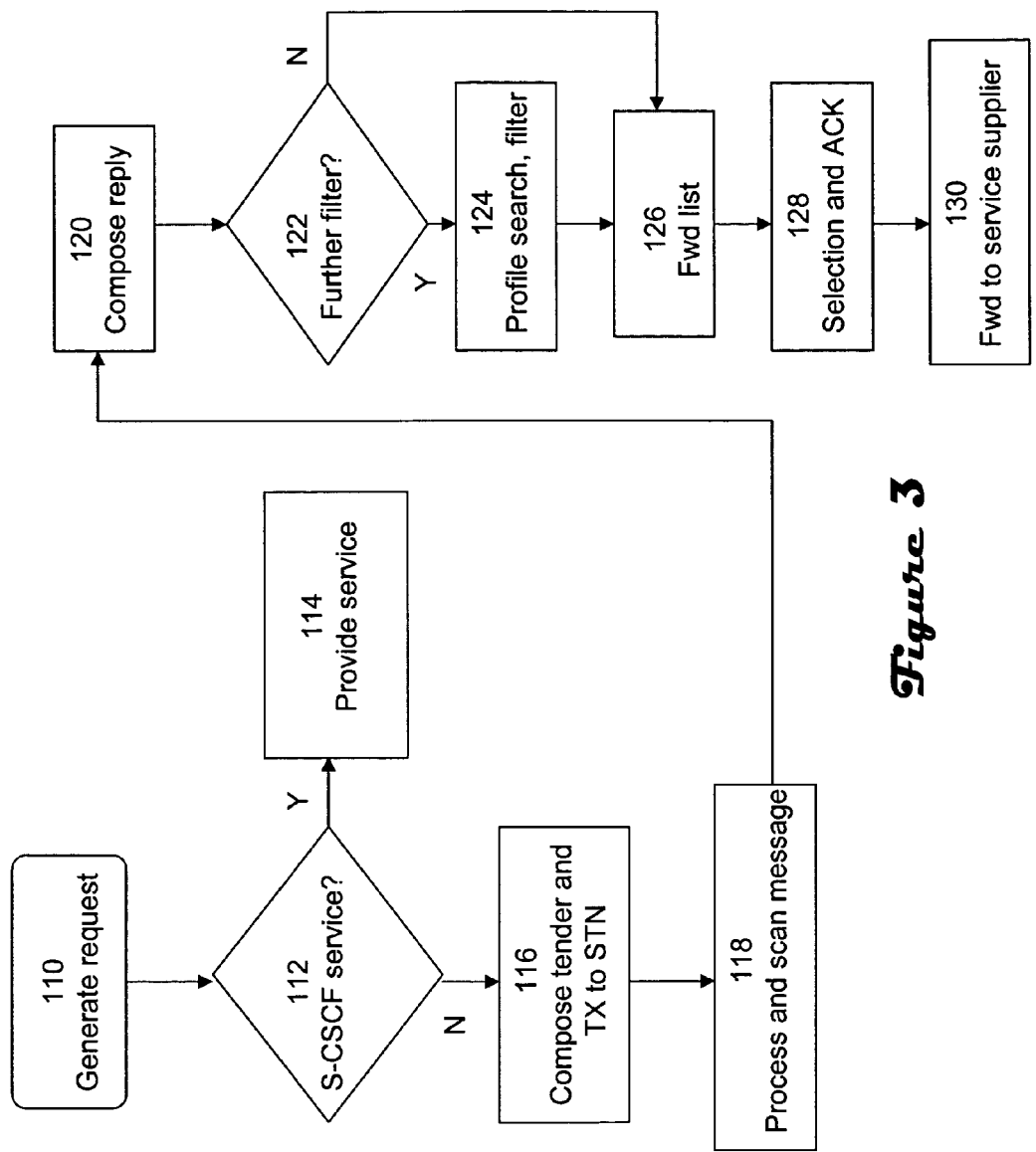
FIG. 3 is a flow diagram illustrating tendering of services in the network architecture of FIG. 1.

FIG. 3 illustrates a method of operation of the invention. In an initial step 110 Subscriber A generates and sends a service request to the P-CSCF, and the request is forwarded to the S-CSCF for action. A determination 112 is then made whether the S-CSCF can provide the service. If the S-CSCF can provide the service, then it does so 114. If the S-CSCF cannot provide the service within its existing set of capabilities it attempts to find the service elsewhere. In particular, the S-CSCF composes a tender message indicating the relevant standard and subjective parameters, and transmits the message to the service tender node in step 116. The service tender node processes the tender message and scans the index to attempt to locate matches of the standard and subjective parameters in step 118. The scan produces n matches. The service tender node is then operative to compose a reply in step 120 which contains, for each of the n matches of service suppliers, an active link to the service and the content of the subjective parameters. The reply is then transmitted to the S-CSCF. Subsequently, a decision is made in step 122 at the S-CSCF whether to further filter the services identified in the reply, e.g., based upon subscriber A's billing preferences. If further filtering is selected, a profile search is performed in step 124 which, in the illustrated example reveals that there is a billing preference. Also in step 124, the profile information is then employed to filter the services indicated in the reply, e.g., by eliminating services which are not indicated to be billable in accordance with subscriber A's billing preferences. The remaining services are then forwarded to subscriber A's device in step 126 for final selection and acknowledgement of service initiation request, i.e., so subscriber A may indicate approval to be billed for the service. Subscriber A's selection of a specific service confirmation is indicated by a message transmitted to the S-CSCF, i.e., an ACK message in step 128. Once the ACK is received at the S-CSCF, the service request is forwarded to the selected service supplier for execution in step 130. Subscriber A then contacts the selected service supplier for the fulfillment of the service. The S-CSCF notifies the appropriate billing system as per Subscriber A's preference.

The basic principles of service fulfillment as executed by the STN are also applicable to non-telephony environments. For example, the S-CSCF to STN interface could be employed in personal computing via an interface such as OSA/PARLAY, or WS, i.e., a gateway to the STN. Such an implementation would provide PC-based users with the opportunity to request, select and access services that may or may not be provided by their service provider. Essentially, the service provider service gateway (OSA/Parlay, WS, or other) would interact with the STN to request services in the same manner as described above. One difference however is that the user-to-gateway interactions need not necessarily be SIP-based as described above.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. Telecommunications network apparatus for facilitating tendering of services in response to a tender request generated in response to subscriber input comprising:
   a first interface operative to receive the tender request initiated by a subscriber;
   a second interface for communicating with a plurality of service supplier devices;
   an index including records of services available from the service supplier devices; and
   a search function operative in response to the tender request to determine whether a statically provisioned service matches the tender request and, if no statically provisioned service matches the tender request, to search the index to identify available third party services which match the tender request.

2. The apparatus of claim 1 wherin the index records include a link to the service supplier device, a set of standard parameters indicating a type of service and a set of subjective parameters.

3. The apparatus of claim 2 wherein the subjective parameters are specified by a service supplier.

4. The apparatus of claim 2 wherein the search function is operative to math the tender request with the standard parameters of the records, and further including a filter function operative to filter the matching available services based at least in-part upon comparison of a subscriber profile with the subjective parameters of the matching available services.

5. The apparatus of claim 4 wherein the filtered matching services are presented to the subscriber for selection.

6. The apparatus of claim 2 wherein the standard parameters include parameters selected from the group consisting of: a Service Identifier, a Desired Quality, a Security Method, an Approximate Start Time, a Media Type, a Transport Protocol, a Cost Target, Device Characteristics, a Maximum Number of Service Suppliers limit, a Rating Method, Access Restrictions, and a SLA Guarantee.

7. The apparatus of claim 2 wherein the subjective parameters includes parameters selected from the group consisting of: a Geographical Proximity indicator, a Consumer Billing Preference indicator, and Currency Preference.

8. The apparatus of claim 1 further including a messaging protocol for communications between the apparatus and service suppliers via the second interface, the messaging protocol operative to facilitate automation of index maintenance.

9. The apparatus of claim 8 wherein the messaging protocol includes messages selected from the group consisting of: a Service Offer message by which a supplier indicates to a service tender node that the supplier desires to vend a service; a Service Accepted message indicating to the supplier that the service identified in the Service Offer message has been added to the index and is ready for tender; a Service Denied message indicating to the supplier that there is a problem with information in the adaptive service definition of the service; a Disable Service message indicating a request that the service tender node remove an identified service from the index; a Service OK? message operative to determine that the service and the active link are functioning properly; a Service OK! message operative to indicate that the service and the active link are functioning properly; and a message operative to verify the identity of the service supplier.

10. A method of facilitating tendering of services in a telecommunications network in response to a tender request generated in response to subscriber input comprising the steps of:
receiving a tender request initiated by a subscriber;
determining whether a statically provisioned service matches the tender request; and
if no statically provisioned service matches the tender request, searching an index including records of services available from service supplier devices to identify available third party services which match the tender request.

11. The method of claim 10 wherein the index records include a link to the service supplier device, a set of standard parameters indicating a type of service and a set of subjective parameters.

12. The method of claim 11 including the further step of a service supplier specifying the subjective parameters for a service offered by that service supplier.

13. The method of claim 11 including the further step of matching the tender request with the standard parameters of the records, and further including the step of matching available services based at least in-part upon comparison of a subscriber profile with the subjective parameters of the matching available services.

14. The method of claim 13 including the further step of presenting the filtered matching services to the subscriber for selection.

15. The method of claim 11 wherein the standard parameters include parameters selected from the group consisting of: a Service Identifier, a Desired Quality, a Security Method, an Approximate Start Time, a Media Type, a Transport Protocol, a Cost Target, Device Characteristics, a Maximum Number of Service Suppliers limit, a Rating Method, Access Restrictions, and a SLA Guarantee.

16. The method of claim 11 wherein the subjective parameters includes parameters selected from the group consisting of: a Geographical Proximity indicator, a Consumer Billing Preference indicator, and Currency Preference.

17. The method of claim 10 further including a messaging protocol for communications between the apparatus and service suppliers operative to facilitate automation of index maintenance.

18. The method of claim 17 wherein the messaging protocol includes messages selected from the group consisting of: a Service Offer message by which a supplier indicates to a service tender node that the supplier desires to vend a service; a Service Accepted message indicating to the supplier that the service identified in the Service Offer message has been added to the index and is ready for tender; a Service Denied message indicating to the supplier that there is a problem with information in the adaptive service definition of the service; a Disable Service message indicating a request that the service tender node remove an identified service from the index; a Service OK? message operative to determine that the service and the active link are functioning properly; a Service OK! message operative to indicate that the service and the active link are functioning properly; and a message operative to verify the identity of the service supplier.

* * * * *

UNITED STATES PATENT AND TRADEMARK OFFICE
CERTIFICATE OF CORRECTION

PATENT NO.       : 7,653,189 B1
APPLICATION NO.  : 10/937573
DATED            : January 26, 2010
INVENTOR(S)      : Fournier et al.

It is certified that error appears in the above-identified patent and that said Letters Patent is hereby corrected as shown below:

At column 6, line 54, delete "wherin" and insert --wherein--.

At column 6, line 61, delete "math" and insert --match--.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

PATENT NO. : 7,653,189 B1
APPLICATION NO. : 10/937573
DATED : January 26, 2010
INVENTOR(S) : Fournier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1508 days.

Signed and Sealed this

Twenty-first Day of December, 2010

David J. Kappos
*Director of the United States Patent and Trademark Office*